Dec. 25, 1962　　J. A. JULIAN　　3,069,997
APPARATUS FOR PREVENTING EXFILTRATION OF SMOKE-LADEN
AIR FROM SMOKEHOUSE ENCLOSURES
Original Filed March 28, 1960　　3 Sheets-Sheet 1

INVENTOR.
JOHN A. JULIAN
BY
ATTY.

United States Patent Office 3,069,997
Patented Dec. 25, 1962

3,069,997
APPARATUS FOR PREVENTING EXFILTRATION OF SMOKE-LADEN AIR FROM SMOKEHOUSE ENCLOSURES
John A. Julian, Kenilworth, Ill., assignor to Julian Engineering Company, Chicago, Ill., a corporation of Illinois
Continuation of application Ser. No. 18,082, Mar. 28, 1960. This application May 22, 1961, Ser. No. 111,780
19 Claims. (Cl. 99—259)

The present invention relates to the processing of food products such as hams, sausages and the like, wherein a series of operations are employed, including the application of heat and smoke for the purpose of imparting desired characteristics to the finished products. The invention is particularly concerned with smokehouse enclosures in which meat products, principally those of the sausage variety, are subjected to temperature and humidity control and to the application of smoke in prescribed densities and in steps according to a predetermined schedule of operation, to the end that a uniform product is obtained having the desired physical characteristics of taste, color, consistency and appearance. Specifically, the invention relates to an apparatus for preventing exfiltration of smoke-laden air from the interior of smokehouses around the edges of smokehouse doors.

The isolation of smoke and its confinement within smokehouse enclosures have long presented a problem to meat packers, the design of existing smokehouse doors being such that it is practically impossible to prevent leakage of smoke-laden air therefrom. In an effort to reduce smoke exfiltration to a minimum, door openings with relatively wide door sills and jambs against which continuous resilient gaskets are compressed have been employed but with little success. Where swinging doors are employed, it has been found that even with gaskets of superior design and quality, door maintenance is required on the average of every other day. Where sliding doors are involved, more frequent maintenance is necessary due to frictional deterioration incident to passage of the doors along the sills.

The leakage of smoke-laden air from smokehouse enclosures is extremely troublesome to meat packers and it is a constant source of irritation to government inspectors and union and company officials alike. Where the smokehouse is disposed in the same enclosure with other operations, employee dissatisfaction is prevalent, especially in the packing room where the female employees frequently quit after a comparatively short period of work. As a consequence, many packers maintain their smokehouses in a separate building, thus necessitating additional handling of the food products in transporting them from the separate building to the packing room. Additionally, the use of high sills is a source of annoyance to the truck operators who, in bringing their loaded floor trucks into the smokehouse enclosures, encounter a jolt as the truck wheels pass over the sills, thus frequently causing food product spillage from the trucks. Such high sills further limit the use of pallet trucks which are unable to surmount the sills. This limitation has led to the positioning of entrance and exit ramps on opposite sides of the sills, the ramps being removable to permit proper door-closing operations.

The present invention is designed to overcome the above-noted limitations that are attendant upon the construction and use of conventional smokehouse doors and, toward this end, the invention contemplates the provision of a novel door construction for smokehouses and similar food-treating and processing enclosures, as well as a control system whereby smoke-laden air which ordinarily has a tendency to exfiltrate from a smokehouse enclosure around the edges of the smokehouse door assemblies, whether the door assemblies be of the swinging or sliding type, is captured and either returned to the interior of the smokehouse or is conducted from the building in which the smokehouse is contained and discharged to the atmosphere at an unobjectionable level.

The provision of a smokehouse door construction and control system of the character briefly outlined above being among the principal objects of the invention, another and important object is to provide such a door and system wherein the use of door sills is completely eliminated, thus rendering the door opening readily adaptable to the ready passage therethrough of floor trucks, pallet trucks and the like.

A similar and related object of the invention is to provide a door construction of this sort which, despite the absence of a door sill, makes provision for the prevention of moisture run-out so that any pools of liquid which may accumulate on the floor of the smokehouse within the confines of the smokehouse enclosure will be prevented from flowing from the enclosure when the door is opened.

A still further object of the invention is to provide a novel door construction which embodies door assemblies proper of either the sliding or swinging type and, in either event, is characterized by the absence of marginal sealing gaskets, yet which, despite the absence of such gaskets, will effectively prevent smoke exfiltration through the door opening.

In carrying out the above-mentioned objects, briefly, the invention contemplates the provision of a smokehouse having the usual rectangular door opening and in which such opening is bounded by vertical side jambs, an upper horizontal jamb, and a lower threshold. The three jambs are hollow and the upper horizontal jamb communicates at its ends with the upper ends of the vertical side jambs. A double door construction is employed including an inner and an outer door, the two doors being movable between open and closed positions relatively to the jambs and threshold. In their closed positions, the inner and outer doors are in juxtaposition with the jambs and threshold and form, in effect, a relatively narrow, but not necessarily sealed, compartment or vestibule from which air is continuously evacuated under the influence or control of a blower. The side jambs communicate with the interior of the vestibule through openings arranged at various elevations therealong and the top jamb constitutes, in effect, a manifold for the two vertical side jambs so that by connecting the top jamb to the intake side of the blower, subatmospheric pressure will obtain in the vestibule and the air contained therein together with any smoke which may enter the vestibule by leakage around the edges of the inner door from the smokehouse enclosure proper, will continuously be drawn from the vestibule and thus will not pass outwardly around the edges of the outer door. In one form of the system, the exhaust side of the blower is connected to the interior of the smokehouse enclosure proper. In another form of the system, the exhaust side of the blower is connected to the intake side of the main smokehouse blower which is employed for air circulation throughout the smokehouse enclosure. In a third form of the system, the exhaust side of the blower communicates with the atmosphere exteriorly of the building in which the smokehouse is situated. In a fourth form of the system, the intake side of the main smokehouse blower is operatively connected to the top jamb, thus eliminating the necessity of providing a separate blower specifically for vestibule evacuation purposes. Broadly, this in essence constitutes the present invention.

The provision of an assembly of smokehouse door construction and control system therefor which is of a simplified nature and requires no expensive equipment, thus contributing toward low cost of production; one which is comprised of a minimum number of moving parts and, therefore, is unlikely to get out of order; one which, because of the elimination of sealing gaskets requires no nicety of initial adjustment in the installation thereof; one which, for the same reason, is rugged and durable and therefore capable of rough usage without damage; one which is adaptable to use in connection with a wide variety of smokehouses, whether the same be individually arranged or disposed in batteries; one which may be constructed as original equipment for new smokehouse installations or applied to existing installations with a minimum of alteration; one which is smooth, silent and efficient in its operation; and one which is well adapted to perform the services required of it, are further desiderata which have been borne in mind in the production and development of the present invention.

Numerous other objects and advantages of the invention, not at this time enumerated, will become more readily apparent as the nature of the invention is better understood.

In the accompanying three sheets of drawings forming a part of this specification, several adaptations and embodiments of the invention have been shown.

In these drawings.

Figure 1:
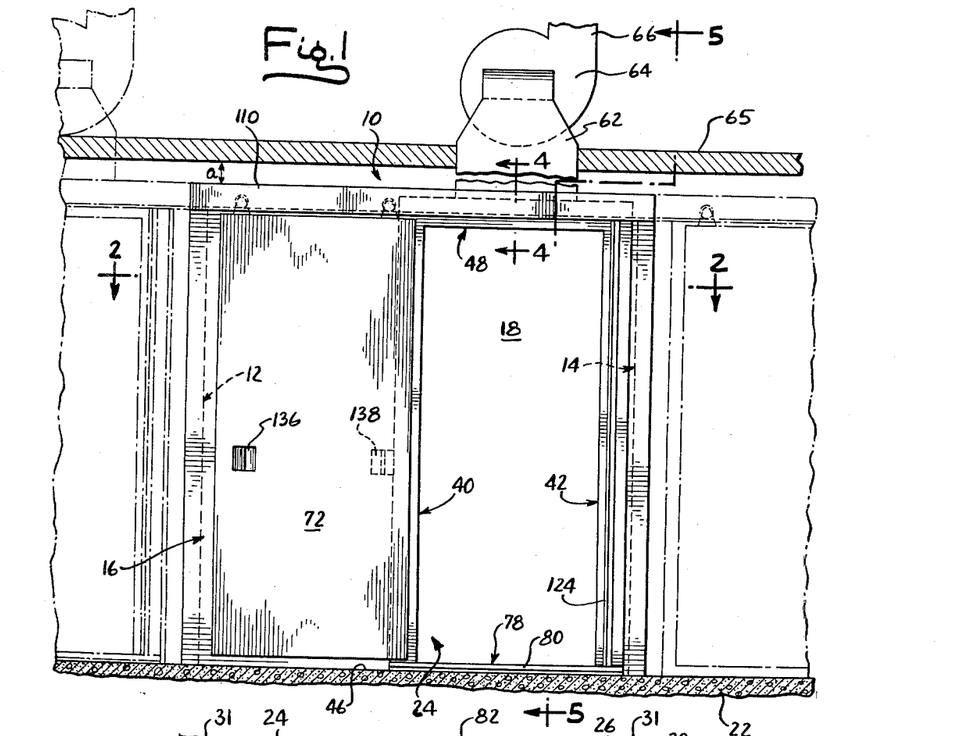
FIG. 1 is a fragmentary front elevational view, partly in section, of a battery of smokehouses embodying the principles of the present invention.

Referring now to the drawings in detail and in particular to FIG. 1, there has been disclosed therein a battery of individual smokehouses 10 which, except for the door constructions thereof and the individual smoke isolating control systems which are associated therewith and comprise the present invention, may be of conventional design and construction. The product-treatment apparatus whereby the meat products are subjected to temperature and humidity changes and to the application of smoke in prescribed densities and which usually are contained principally within the confines of the smokehouses 10 have not been illustrated herein since they are related to the apparatus of the present invention only in an indirect way. For a detailed disclosure of a smokehouse having such product treatment apparatus, reference may be had to United States Letters Patent No. 2,625,095, granted to me on January 13, 1953. For purposes of disclosure of the present invention it is deemed sufficient to illustrate only the smokehouse shell, i.e., the enclosure-defining walls and the floor foundation therefor.

Figure 3:
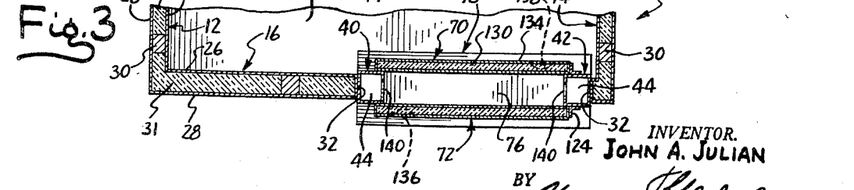
FIG. 3 is a sectional view similar to FIG. 2 but showing the smokehouse door assemblies in their closed condition.
Figures 4, 5, 6:
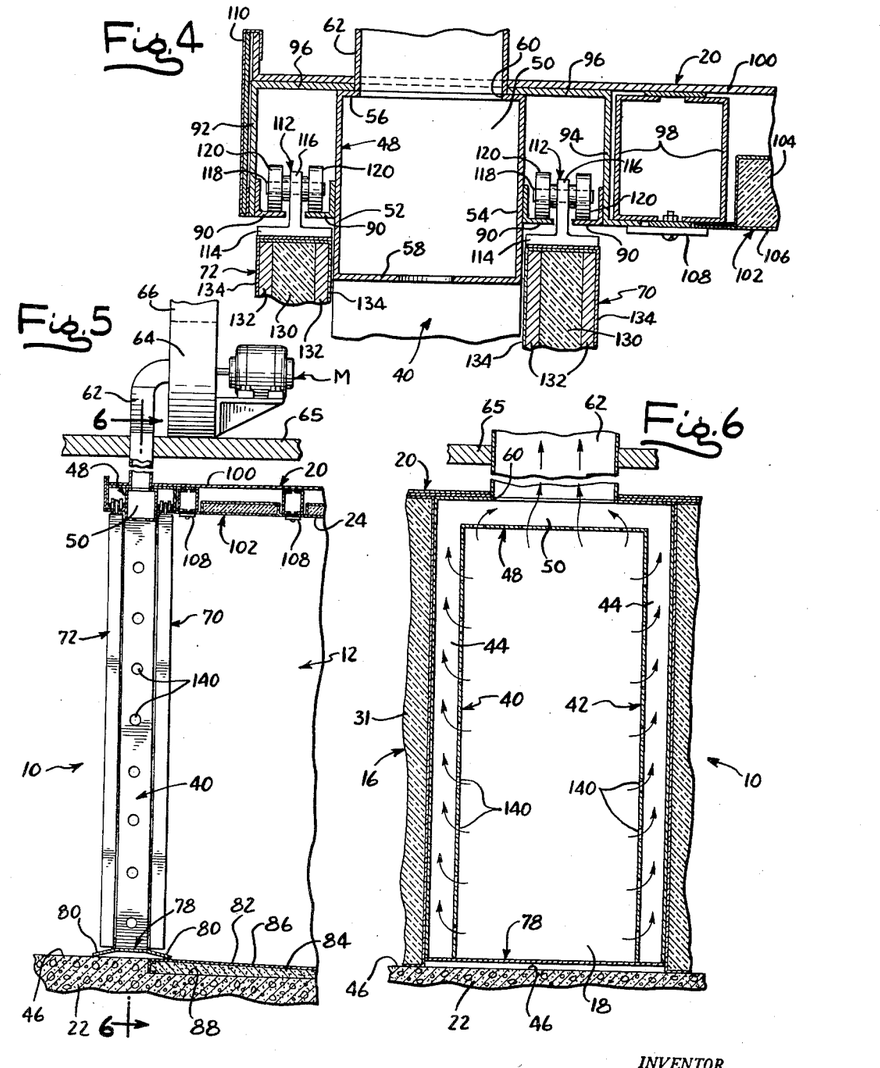
FIG. 4 is an enlarged sectional view taken on the line 4—4 of FIG. 1.
FIG. 5 is a sectional view taken on the line 5—5 of FIG. 1.
FIG. 6 is a sectional view taken on the line 6—6 of FIG. 5.

Accordingly, each smokehouse involves in its general organization a pair of side walls 12 and 14 (FIGS. 2 and 3), a front wall 16, a rear wall 18, and a top wall or ceiling 20 (FIGS. 5 and 6). The various walls, together with the floor or foundation structure 22, define therebetween a smokehouse enclosure 24 in which various food products are treated in a prescribed manner. The smokehouse walls are of a composite nature, the vertical, side and rear walls including inner and outer wall panels 26 and 28 respectively which are supported on vertical studs 30 and between which there is disposed suitable insulating material 31. The horizontal top wall 20 is also of a composite nature and the details thereof will be set forth presently.

The inner wall panels 26 are preferably formed of stainless steel. The disclosure of the various smokehouse walls herein is merely exemplary and it will be understood that other forms of wall structures which differ widely in their character may be employed if desired.

The front wall 16 is provided with the usual rectangular door opening 32 by means of which access to the smokehouse enclosure 24 may be had for the purpose of introducing untreated food products into the smokehouse and for removing the treated products.

The arrangement of parts thus far described is purely conventional in its design and construction and no claim is made herein to any novelty associated with the same, the novelty of the present invention residing rather in the closure means for the door opening 32 and the pneumatic evacuation system therefor whereby the smoke-laden atmosphere normally maintained within the enclosure 24 under predetermined superatmospheric pressure will be prevented from exfiltration through the door opening 32 and into the interior of the building within which the smokehouse is installed.

Figure 2:
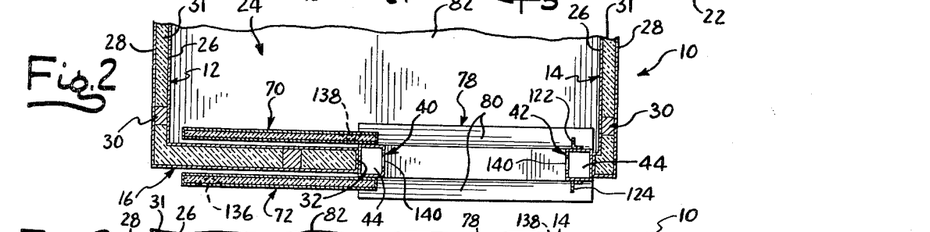
FIG. 2 is a sectional view taken on the line 2—2 of FIG. 1 in the direction indicated by the arrows.

As best shown in FIGS. 1 to 3 inclusive, the door opening 32 has installed therein a door jamb structure including a vertically extending proximate jamb member 40 and a vertically extending terminal jamb member 42, the two members being of similar design and each being in the form of an elongated tubular open-ended box-like structure which is generally square in transverse cross-section and being hollow provides, in effect, an internal vertically extending air duct 44 extending from a region adjacent to the top surface 46 of the foundation structure 22 to the top wall 20. The jamb structure further includes an elongated horizontally extending top jamb member 48 which likewise is tubular and generally square in transverse cross-section. The top jamb member 48 communicates at its ends with the upper open ends of the vertically extending jamb members 40 and 42 as best seen in FIG. 6. The jamb member 48 thus provides, in effect, an internal manifold duct 50. The horizontal top jamb member 48 underlies the upper horizontal edge of the door opening 32 and its association with the composite top wall 20 is such that it may be regarded as a portion of the latter to the extent that it is welded in position in the top wall as shown in FIG. 4 in a manner that will be described presently.

The horizontal top jamb member 48 includes parallel side walls 52 and 54 (FIG. 4), a top wall 56 and a bottom wall 58. The top wall 56 is provided with an elongated longitudinally extending slot 60 therein which communicates with an intake duct 62 leading to the suction or inlet side of a blower 64. The latter is driven by or operable under the control of an electric motor M. As shown in FIGS. 1 and 5, the blower 64 and the motor M are positioned above the ceiling structure 65 of the room or enclosure in which the smokehouse 10 is disposed, it being understood, however, that the positioning of the blower 64 and the motor M is only exemplary. The structure 65 may be a ceiling directly above the floor on which the smokehouse is mounted, or it may be a building roof structure. If the distance designated at a in FIG. 1 is sufficiently great as to permit positioning of the blower 64 and motor M directly on the smokehouse top wall 20, they may be so positioned. The exhaust duct 66 of the blower may lead directly to the atmosphere outside the building in which the smokehouse is installed, or alternatively, it may communicate with the interior of the smokehouse in the manner indicated in FIGS. 7 and 8 respectively as will be described in detail subsequently.

Referring now to FIGS. 1 to 5 inclusive, the jamb structure 40, 42, 48 has associated therewith a pair of independently operable smokehouse doors including an inner door 70 and an outer door 72. In the forms of the invention shown in FIGS. 1 to 9 inclusive, the two doors are of the sliding type, whereas in FIG. 10 swinging doors are employed, these latter doors being reserved for subsequent description.

The two doors are independently or separately shiftable between retracted or open positions as shown in FIG. 2 wherein they straddle the front wall 16 of the smokehouse 10, and advanced or closed positions wherein they extend across the door opening 32 immediately within and immediately without the smokehouse respectively. When in their advanced or closed positions, the two doors 70 and 72 are spaced from each other a small distance and they, in combination with the inside faces of the three jamb members 40, 42 and 48, and with the floor surface 46, define a narrow enclosure or vestibule 76. A threshold plate 78 of small height and with ramp-defining side wings 80 of small inclination may, if desired, extend across the bottom of the door opening 32 and underlie the doors 70 and 72 when the latter are in their closed positions. If desired, the foundation structure 22 may have associated therewith a composite insulated floor panel 82 including an insulating slab 84 and a floor tread 86, the panel 82 being set within a recess 88 in the foundation structure 22. The specific masonry work which is associated with the smokehouse 10 bears only an indirect relationship to the present invention, and various other forms of masonry work are, of course, contemplated.

The inner and outer doors 70 and 72, respectively, are movably suspended on respective pairs of rails 90 (FIGS. 4 and 5), one rail of each pair being carried by the side walls 52 or 54 of the upper jamb member 48, as the case may be. The other rail 90 of each pair of rails is supported on a downturned flange 92 or 94, as the case may be, formed on a structural member 96 which is associated with the composite top wall 20 of the smokehouse.

The remainder of the composite top wall 20 forms no part of the present invention and it may be varied as desired. It is deemed sufficient for purposes of description herein to state that, in general, this top wall includes various structural members, such as the members shown at 98, an outer wall panel proper 100, and inside top wall panels 102 which may be sections of plywood or other heat insulating material 104 which is covered with stainless steel sheet material 106 and is held in position on the structural members 98 by suitable clamping assemblies 108. The fascia portions of the composite top wall 20 may have applied thereto various stainless steel trim pieces 110.

Still referring to FIGS. 4 and 5, the suspension means for the doors 70 and 72, in addition to the rails 90, include a plurality of trolley assemblies 112, each of which is in the form of a generally T-shaped trolley carriage having a flat base 114 suitably secured to the upper horizontal edge of one of the doors, and an upstanding web portion 116 which carries a transverse shaft 118 having rollers 120 mounted thereon and straddling the web portion 116. The web portions 116 of the various trolley assemblies 112 project upwardly between the adjacent pair of rails 90 and the rollers carried thereby ride upon the rails, as clearly shown in FIG. 4, thus suspending the door 70 or 72, as the case may be, in its proper sliding relationship alongside the front wall 16 of the smokehouse 10. The terminal door jamb member 42 has welded thereto on opposite sides thereof abutment angles 122 and 124 for limiting the advanced or closed positions of the doors 70 and 72 respectively.

The two doors 70 and 72 are substantially identical in construction and each is in the form of a composite door panel, including an inner cork or other insulation panel 130 sandwiched between a pair of plywood panels 132, the assembly being covered with stainless steel sheet material 134. The height of the doors 70 and 72 is such that these doors completely span the distance between the horizontal jamb member 48 and the threshold plate 78 with the upper edge regions of the doors slightly overlapping the lower edge regions of the member 48, as best shown in FIG. 4. Each door is provided with inside and outside operating handles 136 and 138 respectively.

Referring now to FIGS. 2, 3 and 5, the vestibule 76 which is created when the doors 70 and 72 are both in their closed positions across the door opening 32 communicates with the interior of the two vertically extending jamb members 40 and 42 through a series of vertically spaced holes 140 in these jamb members.

According to the present invention, it is unnecessary to effect a seal between the two doors 70 and 72 and the proximate and terminal jamb members 40 and 42 respectively when the two doors are in their fully closed positions. Furthermore, it is unnecessary to effect a seal between the upper edges of the doors and the opposite sides of the horizontal jamb member 48, or between the lower edge regions of the doors and the threshold plate 78. Exfiltraiton of the smoke-laden air within the smokehouse 10, which is maintained under slight super-atmospheric pressure during smokehouse operation, and seepage thereof into the vestibule 76, may take place in moderate amounts without defeating the function of the present smoke control system which is, namely, rapidly to evacuate the air which may thus infiltrate into the vestibule. Accordingly, the blower 64 is maintained in constant operation as long as smokehouse operations are in progress, both when the doors are closed or when either or both of them are open. The infiltrated smoke-laden air within the vestibule 76 will thus, when the doors 70 and 72 are both closed, continuously be drawn into the hollow vertically extending jamb members 40 and 42 and flow upwardly through the ducts 44 provided thereby and into the manifold duct 50 afforded by the horizontal jamb member 48. From thence, the smoke-laden air will pass through the intake duct 62 and be discharged through the exhaust duct 66 of the blower 64 to the atmosphere. Since a small amount of fresh air will, due to the presence of a partial vacuum within the enclosure or vestibule 76, be drawn into the vestibule under the lower edge of the outer door 72, no smoke-laden air will escape from the smokehouse enclosure and enter the building enclosure surrounding the smokehouse.

At such time as both doors 70 and 72 are open, as, for example, during smokehouse loading and unloading operations, the constant suction of ar into the vertical jambs 40 and 42 through the various holes 140 will tend to minimize the escape of smoke from the smokehouse enclosure.

The exhaust duct 66 which is associated with the blower 64 has been stated above to be connected directly to the atmosphere, but if desired, this duct may communicate with the inteiror of the smokehouse. In such an instance, a system such as has been shown in FIG. 7 will result. The details of the smokehouse which have been fragmentarily shown in FIG. 7, including the door and vestibule structure, remain substantially the same as those described in connection with the FIGS. 1 to 6 inclusive and therefore, to avoid needless repetition of description, similar numerals of reference but of a higher order, have been applied to the elements of FIG. 7 which correspond to similar elements in the other views. The vestibule 276 is operatively connected to the blower 264 through the intake duct 262 which passes through the ceiling structure 265, as heretobefore described. The exhaust duct 266, however, instead of communicating with the atmosphere outside the building enclosure, is turned laterally as at 267 and projects downwardly through the ceiling structure 265 and enters the smokehouse 210 through the composite top wall 220 and thus communicates directly with the smokehouse enclosure 224. Since normally the atmosphere within the smokehouse 210 is maintained slightly above normal ambient atmospheric pressure, the blower 264 must be capable of delivering air to the discharge duct 266 at a pressure somewhat in excess of the pressure of air maintained within the smokehouse enclosure 224. By an arrangement of this character, a certain amount of smoke reclamation is attained while at the same time, particularly in congested or densely populated areas, a possible smoke nuisance is avoided.

Figures 7, 8, 9:
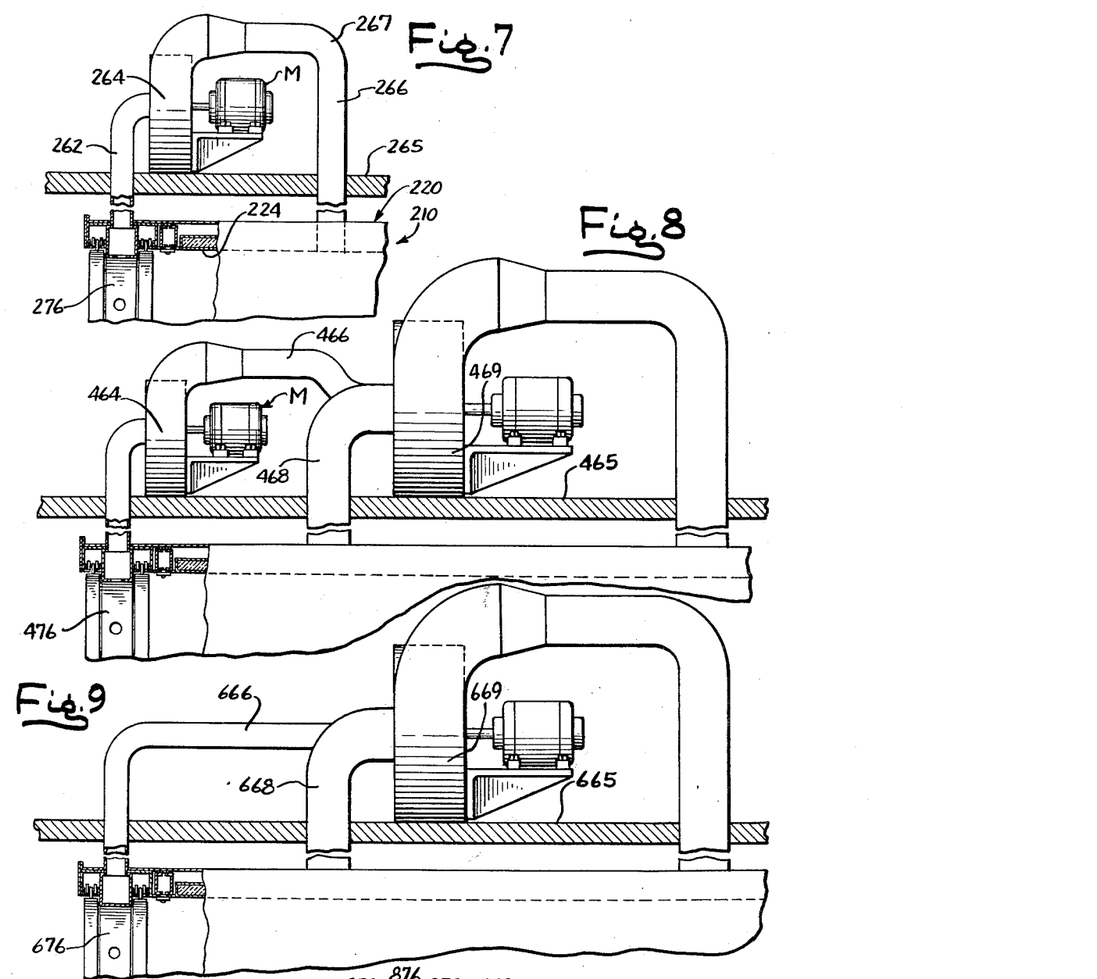
FIG. 7 is a fragmentary sectional view similar to FIG. 5 but showing an alternative form of the control system for vestibule-evacuation.
FIG. 8 is a fragmentary sectional view similar to FIG. 7 but showing another alternative form of the control system.
FIG. 9 is a fragmentary sectional view similar to FIGS. 7 and 8 but showing still another alternative form of the control system.

In FIG. 8 a slightly modified form of control system for smoke evacuation from the smokehouse vestibule is disclosed. Because of similarities in disclosure and, again, to avoid needless repetition of description, similar reference numerals but of a still higher order have been applied to the corresponding parts as between this view and the preceding views. In this form of the control system, the discharge duct 466 of the blower 464 communicates with the intake duct 468 of the main blower 469 which services the various food product treatment operations within the smokehouse such as the circulation of smoke-laden air throughout the interior of the smokehouse and numerous other functions. By thus interconnecting the two blowers 464 and 469, the capacity of the bolwer 464 need not be as great as that of the blower 264 in the form of the invention shown in FIG. 7.

In FIG. 9, again utilizing reference numerals of a higher order to avoid repetition of description, the use of a separate blower for vestibule evacuation purposes has been dispensed with and the duct 666 leading from the vestibule 676 is connected directly to the intake duct 668 of the main smokehouse blower 669. Otherwise the essential features of the invention as disclosed in the preceding views of the drawings remain substantially the same.

It should be understood that in any of the forms of the invention disclosed herein, the exact positioning of the various blowers and the disposition of the ducts which cooperate to make up the pneumatic circuitry for discharging smoke-laden air from the vestibules 76, 276, 476 and 676 may be varied to accommodate varying installations. The blowers may be positioned directly on the top walls of the smokehouses, on a ceiling or a roof of the building within which the smokehouses are installed or in any other appropriate location. Similarly, the various conduits 66, 266, 466 and 666 may pass through wall structures other than the top walls of the smokehouses. Irrespective, however, of these installational details, the essential features of the invention are at all times preserved.

Figure 10:
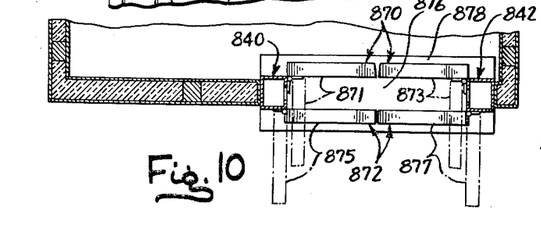
FIG. 10 is a sectional view similar to FIG. 3 but showing a modified form of door construction to which the control systems of FIGS. 5, 7, 8 and 9 may be selectively applied.

In FIG. 10 the construction of the smokehouse proper is substantially the same as that disclosed in FIGS. 1 to 6 inclusive but the door construction for the door opening leading to the interior of the smokehouse is of a modified form. The application of reference numerals of a still higher order has been resorted to in the description of this view to avoid needless repetition of description. The door jamb construction remains substantially the same as the jamb construction illustrated in FIGS. 2 and 3, for example, but with the exception that the inner and outer door assemblies 870 and 872 respectively are of the dual swinging door type. The inner door assembly 870 includes a pair of swinging door panels 871 and 873 which are hinged for swinging movement about respective vertical axes in the immediate vicinity of the vertical jamb members 840 and 842 near the inside edges of the latter. Similarly, the outer door assembly 872 includes a pair of swinging door panels 875 and 877 which are hinged for swinging movement about respective vertical axes in the immediate vicinity of the jamb members 840 and 842 near the outside edges thereof. The width of the door panels 871 and 873 is less than the width of the door panels 875 and 877 and the disposition of the axes of swinging movement of the various panels is such that the various panels may be swung outwardly to their open position without interference with one another. One panel of each pair of panels constitutes a dead leaf panel and it may be releasably locked in its closed position at the top thereof against the horizontal jamb member by suitable locking means (not shown). The other panel of the pair may then be brought against the first panel to complete the door closing operations. In this form of the invention, the various door panels, when closed upon one another, in combination with the three jamb members and the threshold plate 878 define an enclosure or vestibule 876 which is similar to the vestibule 76 and may similarly be evacuated.

The invention is not to be limited to the exact arrangement of parts shown in the accompanying drawings or described in this specification as various changes in the details of construction may be resorted to without departing from the spirit of the invention. Only insofar as the invention has particularly been pointed out in the accompanying claims is the same to be limited.

This application is a continuation of my now abandoned United States patent application Serial No. 18,082, filed on March 28, 1960, and entitled "Apparatus for Preventing Exfiltration of Smoke-Laden Air From Smokehouse Enclosures."

Having thus described the invention what I claim as new and desire to secure by Letters Patent is:

1. A smokehouse designed expressly for treating food products and comprising vertical walls, a ceiling and a floor defining together a normally closed smokehouse enclosure for the food products to be treated, one of said walls having a door opening therein for the admission and removal of said food products with respect to the enclosure, inner and outer door assemblies associated with, and adapted to close said opening, movable between open and closed positions and arranged so that when in their closed position they define between them a narrow vestibule, means for circulating smoke-laden air under superatmospheric pressure through said enclosure in order to treat the food products therein, and a power-operated blower embodying an inlet and an exhaust, having the inlet in communication with the vestibule and its exhaust in communication with the enclosure, and adapted when placed in operation in connection with use of the smokehouse to evacuate air from said vestibule and maintain the same under subatmospheric pressure thereby preventing exfiltration past the outer door assembly of any smoke-laden air which may have infiltrated into the vestibule from said smokehouse enclosure, and in addition to return to the enclosure via the exhaust the evacuated smoke-laden air.

2. A smokehouse designed expressly for treating food products and comprising upstanding walls, a ceiling, and a floor defining together a normally closed smokehouse enclosure for the food products to be treated, one of said walls having a rectangular door opening therein for the admission and removal of said food products with respect to the enclosure, said door opening being defined by spaced vertical side jambs, a horizontal top jamb and said floor, inner and outer door assemblies associated with, and adapted to close the door opening and movable between open and closed positions, said door assemblies when in their closed positions defining, in combination with said jambs and floor, a narrow vestibule of a width substantially equal to the space between the side jambs, means including a motor-driven blower for circulating smoke-laden air under superatmospheric pressure through said enclosure in order to treat the food products therein, and a motor-driven blower separate from and in addition to the first mentioned blower, embodying an inlet and an exhaust, having the inlet in communication with the vestibule and its exahust in communication with the enclosure, and adapted when placed in operation in connection with use of the smokehouse to evacuate air from said vestibule and maintain the same under subatmospheric pressure thereby preventing exfiltration past the outer door assembly of any smoke-laden air which may have infiltrated into the vestibule from said smokehouse enclosure, and to return the evacuated air, together with any smoke which many be entrained therein, to the smokehouse enclosure via said exhaust.

3. A smokehouse designed expressly for treating food products and comprising upstanding walls, a ceiling, and a floor defining together a normally closed smokehouse enclosure for the food products to be treated, one of said walls having a rectangular door opening therein for the admission and removal of said food products with respect to the enclosure, said opening being defined by spaced vertical side jambs, a horizontal top jamb and said floor, inner and outer door assemblies associated with, and adapted to close said opening and movable between open and closed positions, said door assemblies when in their closed positions defining, in combination, with said jambs and floor, a narrow vestibule of a width substantially equal to the space between the side jambs, one of said jambs being hollow and having formed therein openings whereby communication is established between its interior and the aforesaid vestibule, means for circulating smoke-laden air under superatmospheric pressure through said enclosure, and a motor-driven blower provided with an inlet duct in communication with the interior of the hollow jamb, said blower being adapted when placed in operation in connection with use of the smokehouse continuously to evacuate air from the interior of said hollow jamb in order to maintain the vestibule under subatmospheric pressure and thus prevent exfiltration of any smoke-laden air which may have infiltrated thereinto past the outer door assembly.

4. A smokehouse designed expressly for treating food products and comprising upstanding walls, a ceiling, and a floor defining together a normally closed smokehouse enclosure for the food products to be treated, one of said walls having a rectangular door opening therein for the admission and removal of the food products with respect to the enclosure, vertically extending tubular side jamb members coextensive with the vertical edges of said door opening respectively and sealed thereto, a horizontally extending tubular top jamb member coextensive with the top horizontal edge of said door opening and sealed thereto, the interior of said top jamb member being in communication with the interior of each of said side jamb members, inner and outer door assemblies associated with, and adapted to close said door opening and movable between open and closed positions, said door assemblies when in their closed positions defining, in combination with the jamb members and the floor, a narrow vestibule of a width substantially equal to the space between the side jamb members, means for supplying smoke-laden air under superatmospheric pressure to said enclosure, there being openings in the innermost side portions of the side jamb members establishing communication between the aforesaid vestibule and the interiors of the side jamb members, and a motor-driven blower embodying an inlet and an exhaust and having its inlet in direct communication with the top jamb member, said blower being adapted when placed in operation in connection with use of the smokehouse continuously to evacuate air from the interior of said top jamb member and also the interiors of said side jamb members in order to maintain the vestibule under subatmospheric pressure and thus prevent exfiltration past the outer door assembly of any smoke-laden air which may have infiltrated into said vestibule from said smokehouse enclosure.

5. A smokehouse designed expressly for treating food products and comprising upstanding walls, a ceiling, and a floor defining together a normally closed smokehouse enclosure within which the food products are subjected to the application of smoke, one of said walls having a rectangular door opening therein for the admission and removal of the food products with respect to the enclosure, vertically extending tubular side jamb members coextensive with the vertical edges of said door opening respectively and sealed thereto, a horizontally extending tubular top jamb member coextensive with the top horizontal edge of said door opening and sealed thereto, the interior of said top jamb member being in communication with the interior of each of said side jamb members, inner and outer door assemblies associated with, and adapted to close said door opening and movable between open and closed positions, said door assemblies when in their closed positions defining, in combination with the jamb members and the floor, a narrow vestibule of a width substantially equal to the space between the side jamb members, means for supplying smoke-laden air under superatmospheric pressure to said enclosure, there being openings in the inner side portions of the side jamb members establishing communication between the vestibule and the interiors of the side jamb members, a power-operated blower disposed exteriorly of the smokehouse enclosure, and an air duct operatively connecting the suction side of the blower to the interior of said top jamb in order that when the blower is in operation in connection with use of the smokehouse air is withdrawn from the interior of the top jamb member and the interiors of the side jamb members with the result that the vestibule is maintained under subatmospheric pressure and exfiltration past the outer door assembly of any smoke-laden air which may have infiltrated into said vestibule from the smokehouse enclosure is prevented.

6. A smokehouse as set forth in claim 5 and including, additionally, a threshold plate of small vertical height and having side ramp surfaces on opposite sides thereof, said threshold plate bridging the distance between the lower ends of said vertical jamb members and underlying said door assemblies when the latter are in their closed position.

7. A smokehouse designed expressly for treating food products and comprising upstanding walls, a ceiling, and a floor defining together a normally closed smokehouse enclosure within which the food products are subjected to the application of smoke, one of said walls having a rectangular door opening therein for the admission and removal of the food products with respect to the enclosure, vertically extending proximate and terminal tubular side jamb members coextensive with the vertical edges of said door opening respectively and sealed thereto, a horizontally extending tubular top jamb member coextensive with the top horizontal edge of said door opening and sealed thereto, the interior of said top jamb member being in communication with the interior of each of said side jamb members, inner and outer door panels slidably disposed adjacent to said one wall and movable between retracted open positions wherein they uncover said door opening and straddle said one wall in close proximity thereto and advanced closed positions wherein they close said door opening and, in combination with said jamb members and floor, define a narrow vestibule within the door opening, means for supplying smoke-laden air under superatmospheric pressure to said enclosure, there being openings in the inner side portions of said side jamb members establishing communication between the vestibule and the interiors of the side jamb members, and a motor-driven blower embodying an inlet and an exhaust and having its inlet in direct communication with the top jamb member, said blower being adapted when placed in operation in connection with use of the smokehouse continuously to evacuate air from the interior of said top jamb member and the interiors of the side jamb members in order to maintain the vestibule under subatmospheric pressure and thus prevent exfiltration past the outer door panel of any smoke-laden air which may have infiltrated into said vestibule from said smokehouse enclosure.

8. A smokehouse designed expressly for treating food products and comprising upstanding walls, a ceiling, and a floor defining together a normally closed smokehouse enclosure within which the food products are subject to the application of smoke, one of said walls having a rectangular door opening therein for the admission and removal of the food products with respect to the enclosure, vertically extending proximate and terminal tubular side jamb members coextensive with the vertical edges of said door opening respectively and sealed thereto, a horizontally extending tubular top jamb member coextensive with the top horizontal edge of said door opening and sealed thereto, the interior of said top jamb member being in communication with the interior of each of said side jamb members, inner and outer door panels slidably disposed adjacent to said one wall and movable between retracted open positions wherein they uncover said door opening and straddle said one wall in close proximity thereto and advanced closed positions wherein they close said door opening and, in combination with said jamb members and floor, define a narrow vestibule within the door opening, means including a motor-driven blower for circulating smoke-laden air under superatmospheric pressure through said enclosure, there being openings in the inner side portions of the side jamb members establishing communication between the aforesaid vestibule and the interiors of the side jamb members, a blower separate from and in addition to the first mentioned blower and disposed exteriorly of the smokehouse enclosure, and an air duct operatively connecting the suction side of the second mentioned blower to the interior of said top jamb in order that when said second mentioned blower is in operation in connection with use of the smokehouse air is withdrawn from the interior of the top jamb member and the interiors of the side jamb members with the result that the vestibule is maintained under subatmospheric pressure and exfiltration past the outer door panel of any smoke-laden air which may have infiltrated into said vestibule from the smokehouse enclosure is prevented.

9. A smokehouse designed expressly for treating food products and comprising upstanding walls, a ceiling, and a floor defining together a normally closed smokehouse enclosure within which the food products are subjected to the application of smoke, one of said walls having a rectangular opening therein for the admission and removal of the food products with respect to the enclosure, vertically extending proximate and terminal tubular side jamb members coextensive with the vertical edges of said door opening respectively and sealed thereto, a horizontally extending tubular top jamb member coextensive with the top horizontal edge of said door opening and sealed thereto, the interior of said top jamb member being in communication with the interior of each of said jamb members, said ceiling being provided with a fascia overhanging said one wall, a rail extending horizontally along said fascia and substantially coextensive with the upper edge of said one wall exteriorly of the latter, a second rail extending horizontally along the upper edge of said one wall within the smokehouse enclosure and substantially coextensive with said edge, inner and outer door panels on opposite sides of said one wall, trolleys carried at the upper edges of said door panels and supported on said rails respectively for movably suspending the panels from said rails, said door panels being individually movable between retracted open positions wherein they uncover said door opening and straddle said one wall in close proximity thereto and advanced closed positions wherein they close said door opening and, in combination with said jamb members and floor, define a narrow vestibule within the door opening, means for supplying smoke-laden air under superatmospheric pressure to said enclosure, there being openings in the inner side-portions of said side jamb members establishing communication between the vestibule and the interiors of the jamb members, and a motor-driven blower embodying an air inlet and an exhaust and having its inlet in direct communication with the top jamb member, said blower being adapted when placed in operation in connection with use of the smokehouse continuously to evacuate air from the interior of said top jamb member and the interiors of said side jamb members in order to maintain the vestibule under subatmospheric pressure and thus prevent exfiltration past the outer door panel of any smoke-laden air which may have infiltrated into said vestibule from said smokehouse enclosure.

10. A smokehouse as set forth in claim 9 and wherein the blower is disposed exteriorly of the smokehouse enclosure and is independent of the means for supplying smoke-laden air under superatmospheric pressure to the enclosure.

11. A smokehouse designed expressly for treating food products and comprising upstanding walls, a ceiling, and a floor defining together a normally closed smokehouse enclosure within which the food products are subjected to the application of smoke, one of said walls having a rectangular door opening therein for the admission and removal of the food products with respect to the enclosure, vertically extending tubular side jamb members coextensive with the vertical edges of said door opening respectively and sealed thereto, a horizontally extending tubular top jamb member coextensive with the top horizontal edge of said door opening and sealed thereto, the interior of said top jamb member being in communication with the interior of each of said side jamb members, inner and outer door assemblies associated with the door opening and movable between retracted positions wherein they uncover said door opening and advanced positions wherein they close said door opening and, in combination with said jamb members and floor, define a narrow vestibule within the door opening, a main smokehouse blower for circulating smoke-laden air under superatmospheric pressure throughout the enclosure for treatment of the food products within the enclosure, there being openings in the inner side portions of the side jamb members establishing communication between the vestibule and the interiors of said side jamb members, and an air duct operatively connecting the suction side of said blower to the interior of said top jamb member in order that when the blower is in operation in connection with use of the smokehouse air is withdrawn from the interior of the top jamb member and the interiors of the side jamb members with the result that the vestibule is maintained under subatmospheric pressure and exfiltration past the outer door assembly of any smoke-laden air which may have infiltrated into said vestibule from the smokehouse enclosure is prevented.

12. A smokehouse designed expressly for treating food products and comprising upstanding walls, a ceiling, and a floor defining together a normally closed smokehouse enclosure within which the food products are subjected to the application of smoke, one of said walls having a rectangular door opening therein for the admission and removal of the food products with respect to the enclosure, vertically extending tubular side jamb members coextensive with the vertical edges of said door opening respectively and sealed thereto, a horizontally extending tubular top jamb member coextensive with the top horizontal edge of said door opening and sealed thereto, the interior of said top jamb member being in communication with the interior of each of said side jamb members, inner and outer door assemblies associated with the one wall and movable between retracted positions wherein they uncover said door opening and advanced positions wherein they close said door opening and, in combination with said jamb members and floor, define a narrow vestibule within the door opening, a main smokehouse blower disposed exteriorly of the smokehouse enclosure for circulating smoke-laden air under superatmospheric pressure throughout the enclosure for treatment of the food product within the enclosure, there being openings in the inner side portions of the side jamb members establishing communication between the vestibule and the interiors of said side members, a first air duct connecting the intake side of said blower with the smokehouse enclosure at one region thereof, a second air duct connecting the discharge side of said blower with the smokehouse enclosure at a region widely removed from said one region, and a third air duct operatively connecting the interior of said top jamb member and said first air duct in order that when the blower is in operation in connection with use of the smokehouse air is withdrawn from the interior of the top jamb member and the interiors of the side jamb members with the result that the vestibule is maintained under subatmospheric pressure and exfiltration past the outer door assembly of any smoke-laden air which may have infiltrated into said vestibule from the smokehouse enclosure is prevented.

13. A smokehouse designed expressly for treating food products and comprising upstanding walls, a ceiling, and a floor defining together a normally closed smokehouse enclosure within which the food products are subjected to the application of smoke, one of said walls having a rectangular door opening therein for the admission and removal of the food products with respect to the enclosure, a proximate jamb member extending vertically along one side of said door opening and substantially bridging the distance between said floor and ceiling, a terminal jamb member extending vertically along the opposite side of said door opening and substantially bridging the distance between said floor and ceiling, a top jamb member extending horizontally along the upper side of the door opening and bridging the distance between said proximate and terminal jamb members, each of said jamb members being in the form of a hollow elongated box-like structure which is rectangular in transverse cross section, the ends of said top jamb member being in communication with the upper ends respectively of said vertically extending jamb members, an inner door panel slidably disposed adjacent to said one wall in close proximity thereto and within the smokehouse enclosure, an outer door panel slidably disposed adjacent to said one wall in close proximity thereto and exteriorly of the smokehouse enclosure, said door panels being individually movable between retracted open positions wherein they uncover said door opening and advanced closed positions wherein they close said door opening with their vertical side edges and top edges overlapping said proximate, terminal and top jamb members respectively and wherein, in combination with said jamb members and floor, they define a narrow vestibule within the door opening of a width substantially equal to the space between said vertically extending jamb members, means for supplying smoke-laden air under superatmospheric pressure to said smokehouse enclosure, there being openings in the inner side portion of at least one of said jamb members establishing communication between the vestibule and the interiors of all three jamb members, and a motor-driven blower embodying an inlet and an exhaust and having its inlet in direct communication with the top jamb member, said blower being adapted when placed in operation in connection with use of the smokehouse continuously to evacuate air from the interior of one of said jamb members in order to maintain the vestibule under subatmospheric pressure and thus prevent exfiltration past the outer door panel of any smoke-laden air which may infiltrate into said vestibule from said smokehouse enclosure.

14. A smokehouse as set forth in claim 13 and including, additionally, a threshold plate of small vertical height and having side ramp surfaces on opposite sides thereof, said plate bridging the distance between the lower ends of said vertically extending jamb members and underlying said door panels when the latter are in their closed positions.

15. A smokehouse designed expressly for treating food products and comprising upstanding walls, a ceiling, and a floor defining together a normally closed smokehouse enclosure within which the food products are subjected to the application of smoke, one of said walls having a rectangular door opening therein for the admission and removal of the food products with respect to the enclosure, a proximate jamb member extending vertically along one side of said door opening and substantially bridging the distance between said floor and ceiling, a terminal jamb member extending vertically along the opposite side of said door opening and substantially bridging the distance between said floor and ceiling, a top jamb member extending horizontally along the upper side of the door opening and bridging the distance between said proximate and terminal jamb members, each of said jamb members being in the form of a hollow elongated box-like structure which is rectangular in transverse cross section, the ends of said top jamb member being in communication with the upper ends respectively of said vertically extending jamb members, an inner door panel slidably disposed adjacent to said one wall in close proximity thereto and within the smokehouse enclosure, an outer panel slidably disposed adjacent to said one wall in close proximity thereto and exteriorly of the smokehouse enclosure, said door panels being individually movable between retracted open positions wherein they uncover said door opening and advanced closed positions wherein they close said door opening with their vertical side edges and top edges overlapping said proximate, terminal and top jamb members respectively and wherein, in combination with said jamb members and floor, they define a narrow vestibule within the door opening of a width substantially equal to the space between said vertically extending jamb members, a main smokehouse blower for circulating smoke-laden air under superatmospheric pressure throughout the enclosure for treatment of the food products within the enclosure, there being openings in the inner side portion of each of said vertically extending jamb members establishing communication between the vestibule and the interiors of said vertically extending jamb members, and an air duct operatively connecting the suction side of said blower to the interior of said top jamb in order that during operation of the blower in connection with use of the smokehouse air is continuously withdrawn from the top jamb member with the result that said top jamb member is maintained under subatmospheric pressure and air is consequently withdrawn from the vestibule through said vertical jamb members.

16. A smokehouse as set forth in claim 15 and including, additionally, a second blower interposed in the air duct.

17. A smokehouse designed expressly for treating food products and comprising upstanding walls, a ceiling, and a floor defining together a normally closed smokehouse enclosure within which the food products are subjected to the application of smoke, one of said walls having a rectangular door opening therein for the admission and removal of the food products with respect to the enclosure, a proximate jamb member extending vertically along one side of said door opening and substantially bridging the distance between said floor and ceiling, a terminal jamb member extending vertically along the opposite side of said door opening and substantially bridging the distance between said floor and ceiling, a top jamb member extending horizontally along the upper side of the door opening and bridging the distance between said proximate and terminal jamb members, each of said jamb members being in the form of a hollow elongated box-like structure which is rectangular in transverse cross section, the ends of said top jamb member being in communication with the upper ends respectively of said vertically extending jamb members, an inner door panel slidably disposed adjacent to said one wall in close proximity thereto and within the smokehouse enclosure, an outer door panel slidably disposed adjacent to said one wall in close proximity thereto and exteriorly of the smokehouse enclosure, said door panels being individually slidable between retracted positions wherein they uncover said door opening and advanced positions wherein they close said door opening with their vertical side edges and top edges overlapping said proximate, terminal and top jamb members respectively and wherein, in combination with said jamb members and floor, they define a narrow vestibule within the door opening of a width substantially equal to the space between said vertically extending jamb members, abutment pieces on the inner and outer sides of said terminal jamb member and coextensive with the latter for substantial sealing engagement with the adjacent vertical edges of the respective door panels when the latter are in their advanced position, a main smokehouse blower for circulating smoke-laden air under superatmospheric pressure throughout the enclosure for treatment of the food products within the enclosure, there being openings in the vestibule-facing side portion of each of said vertically extending jamb members establishing communication between the vestibule and the interiors of the vertically extending jamb members, and an air duct operatively connecting the suction side of said blower to the interior of the top jamb member in order that during operation of the blower in connection with use of the smokehouse air is continuously withdrawn from the top jamb member with the result that said top jamb member is maintained under subatmospheric pressure and air is consequently withdrawn from the vestible through said vertically extending jamb members.

18. A smokehouse as set forth in claim 17 and including, additionally, a second blower interposed in said air duct.

19. A smokehouse designed expressly for treating food products and comprising upstanding walls, a ceiling, and a floor defining together a normally closed smokehouse enclosure within which the food products are subjected to the application of smoke, one of said walls having a rectangular door opening therein for the admission and removal of the food products with respect to the enclosure, a proximate jamb member extending vertically along one side of said door opening and substantially bridging the distance between said floor and ceiling, a terminal jamb member extending vertically along the opposite side of said door opening and substantially bridging the distance between said floor and ceiling, a top jamb member extending horizontally along the upper side of the door opening and bridging the distance between said proximate and terminal jamb members, each of said jamb members being in the form of a hollow elongated box-like structure which is rectangular in tranverse cross section, the ends of said top jamb member being in communication with the upper ends respectively of said vertically extending jamb members, an inner door panel slidably disposed adjacent to said one wall in close proximity thereto and within the smokehouse enclosure, an outer door panel slidably disposed adjacent to said one wall in close proximity thereto and exteriorly of the smokehouse enclosure, said door panels being individually slidable between retracted positions wherein they uncover said door opening and advanced positions wherein they close said door opening with their vertical side edges and top edges overlapping said proximate, terminal and top jamb members respectively and wherein, in combination with said jamb members and floor, they define a narrow vestibule within the door opening of a width substantially equal to the space between said vertically extending jamb members, a main smokehouse blower disposed exteriorly of the smokehouse enclosure and adapted when operated to circulate smoke-laden air under superatmospheric pressure throughout the enclosure for treatment of the food product within the enclosure, there being openings in the side portions of each of said vertically extending jamb members establishing communication between the vestibule and the interiors of said vertically extending jamb members, a first air duct connecting the intake side of said blower with the smokehouse enclosure at one region thereof, a second air duct connecting the discharge side of said blower with the smokehouse enclosure at a region widely removed from said one region, and a third air duct operatively connecting the interior of said top jamb member and said first air duct in order that during operation of the blower in connection with use of the smokehouse air is continuously withdrawn from the top jamb member with the result that said top jamb member is maintained under subatmospheric pressure and air is consequently withdrawn from the vestibule through said vertically extending jamb members.

References Cited in the file of this patent
UNITED STATES PATENTS
2,154,801   Anderson et al. __________ Apr. 18, 1939